United States Patent Office 3,276,351
Patented Oct. 4, 1966

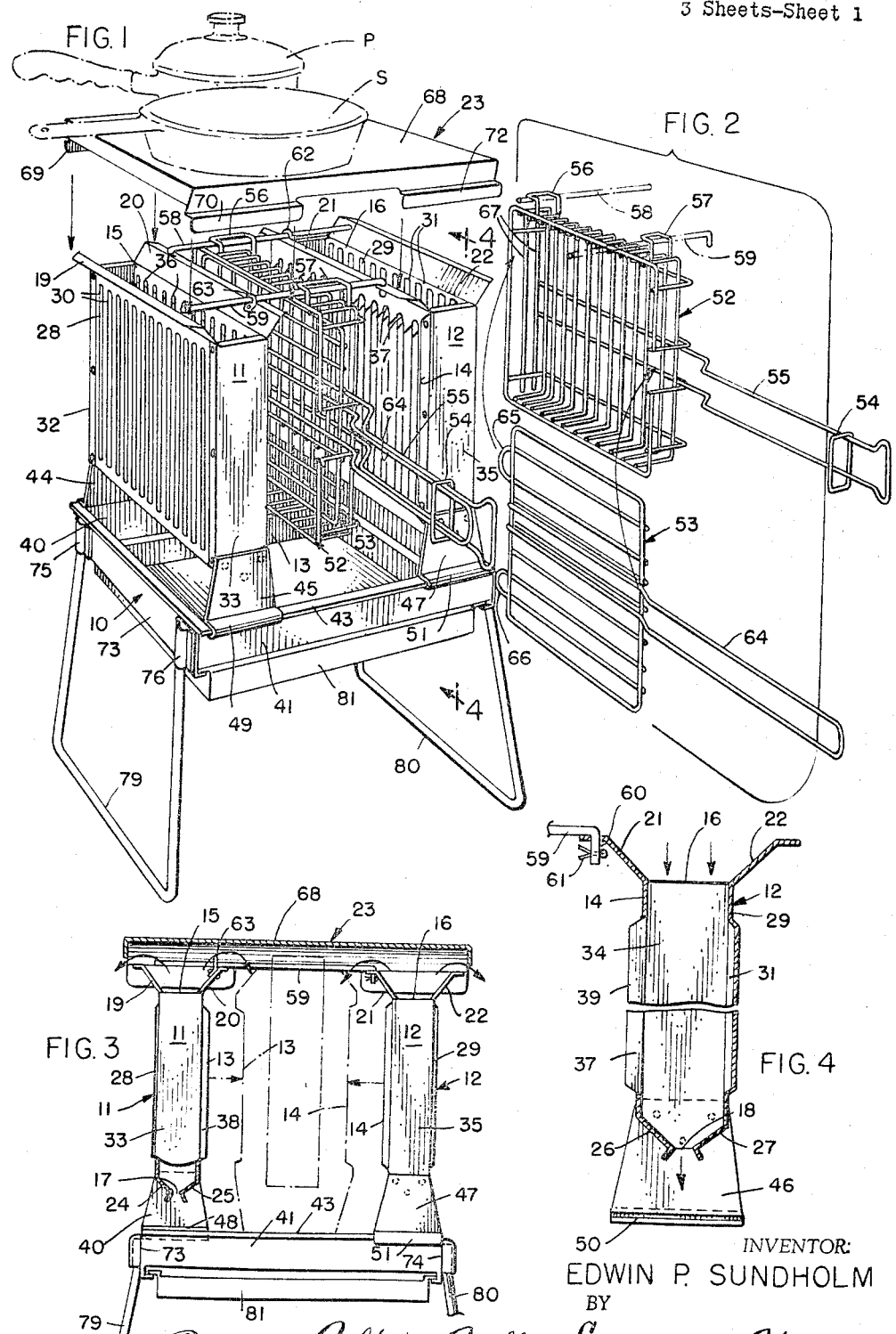
Oct. 4, 1966 — E. P. SUNDHOLM — 3,276,351
PORTABLE CHARCOAL COOKER
Filed March 5, 1964 — 3 Sheets-Sheet 1
INVENTOR:
EDWIN P. SUNDHOLM
BY Dawson, Tilton, Fallon, Lungmus & Alexander
ATT'YS

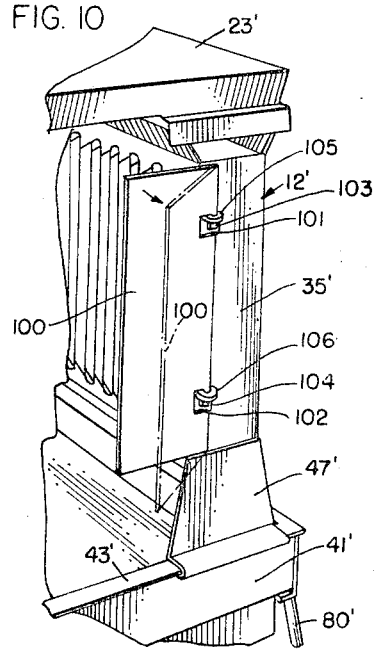
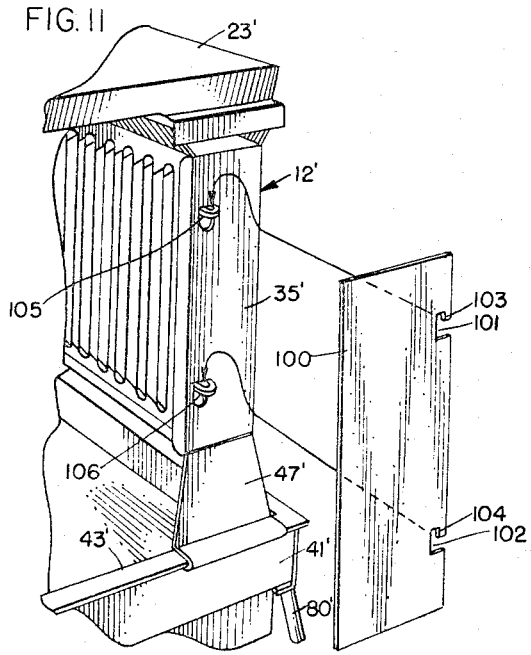
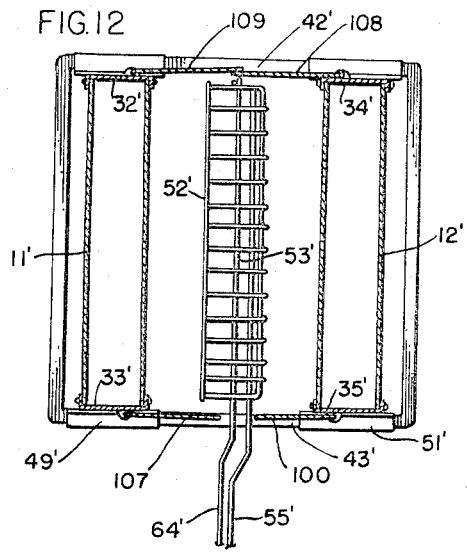
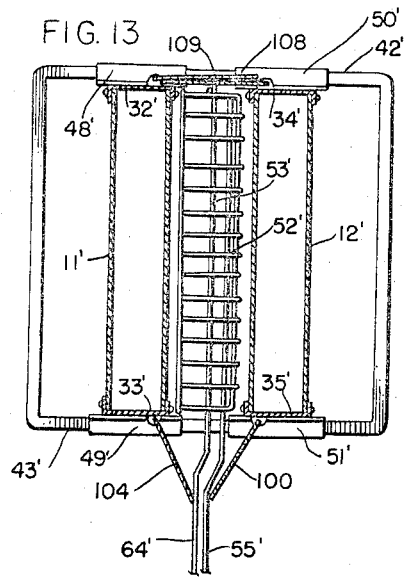

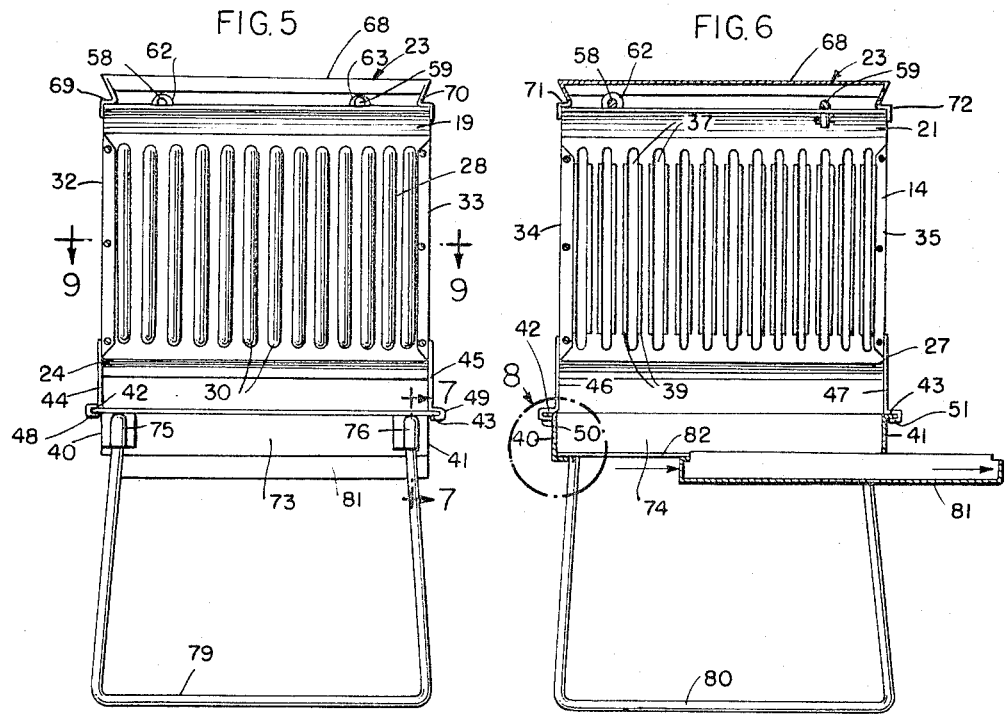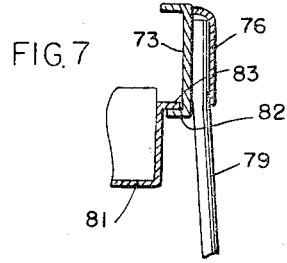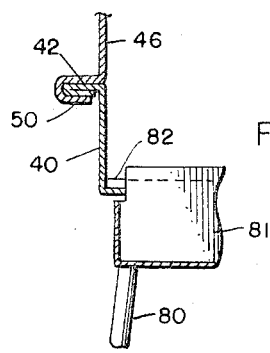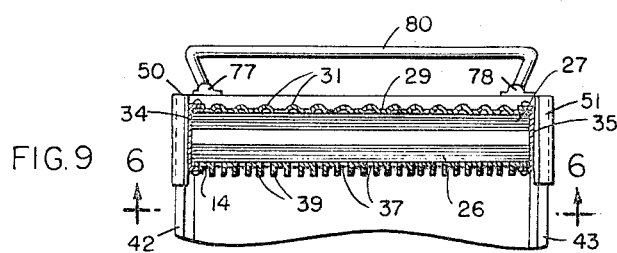

3,276,351
PORTABLE CHARCOAL COOKER
Edwin P. Sundholm, Albert City, Iowa
Filed Mar. 5, 1964, Ser. No. 349,691
2 Claims. (Cl. 99—339)

This invention relates to a portable charcoal cooker which provides a broiler for cooking meat, such as steaks, hamburgers, and the like, together with an auxiliary cooking top which can be used as a grill or as a stove burner for preparing foods in the usual cooking utensils.

Charcoal grills are widely used for outdoor cooking, but their construction and operation tends to limit the types and varieties of foods which can be conveniently prepared, particularly when it is desired to prepare different foods at the same time. There is a need for a compact, lightweight, portable charcoal cooker which will simultaneously grill or broil meats while the rest of the food items for a complete meal are prepared in conventional utensils. Such a charcoal cooker would be much more serviceable for camping, boating, and other outdoor living where it is necessary to prepare complete meals, and could be used instead of gas of gasoline fired camp stoves.

Conventional charcoal grills and cookers also are subject to other disadvantages and limitations. Such units provide no satisfactory means for controlling or regulating the heat radiated to the meat being grilled so as to permit cooking at a controlled rate. Frequently, the extreme heat rapidly melts the fat in the meat, and it drips down on the glowing charcoal and ignites. While water may be used to extinguish such grease fires and to reduce the temperature of the charcoal, this is unsatisfactory because it slows down the cooking. What is needed is a charcoal cooker which eliminates the problem of grease fires, while permitting the meat to be broiled rapidly but with controlled heat.

It is therefore the principal object of the present invention to provide a portable charcoal cooker which substantially overcomes the problems and disadvantages described above. More specifically, it is an object of this invention to provide a portable charcoal cooker which permits a complete meal to be prepared at one time using conventional cooking utensils for part of the metal and also providing for the grilling or barbecueing of meat items. Another specific advantage is to provide a charcoal grill wherein the problem of grease fires from dripping grease is substantially overcome while permitting the meat to be broiled rapidly and at a controlled rate. Another related object is to provide a charcoal grill which can be readily assembled and disassembled, and which when disassembled is compact and easily transportable. A further object is to provide a charcoal grill including means for holding meat to be barbecued which permits the meat to be readily inserted and removed from the grill. Further objects and advantages will be indicated in the following detailed specification.

A portable charcoal cooker constructed in accordance with the present invention is illustrated in the accompanying drawings, wherein—

FIGURE 1 is a perspective view of the cooker, the cooking top being shown in separated relation for greater clarity and utensils which might be used on the top being shown in phantom;

FIGURE 2 is a perspective view of the broiler basket assembly, the cover being shown in separated relation from the basket for greater clarity;

FIGURE 3 is an elevational end view of the cooker, portions of the cooker being broken away and shown in section to illustrate the functional relation of the parts and the position of the basket assembly being indicated in phantom, as well as the selectively adjustable position of the fire boxes being indicated in phantom;

FIGURE 4 is a sectional elevation view of one of the fire boxes taken on line 4—4 of FIGURE 1;

FIGURE 5 is a side elevational view of the complete cooker;

FIGURE 6 is a sectional elevational view taken on line 6—6 of FIGURE 9 illustrating the ash and drippings tray in partially pulled out condition;

FIGURE 7 is a detail sectional view taken on line 7—7 of FIGURE 5;

FIGURE 8 is an enlarged sectional detail view of the area 8 in FIGURE 6; and

FIGURE 9 is a sectional top view of a portion of the cooker taken on line 9—9 of FIGURE 5;

FIGURE 10 is a fragmentary perspective view illustrating a modification of the cooker of the preceding figures;

FIGURE 11 is a perspective view similar to FIGURE 10 except that the hinged door is shown in separated relation;

FIGURE 12 is a top view of the modified cooker with the cooker top removed, showing the fireboxes in an outer position; and FIGURE 13 is a top plan view similar to FIGURE 12, showing the fireboxes in an inner position.

Looking first at FIGURE 1, it will be seen that the charcoal cooker includes a support frame 10, a pair of vertically-extending fireboxes 11 and 12 which are carried by the frame 10, with their inner faces 13, 14 in opposed, spaced-apart relation. The fireboxes 11 and 12 are adapted for the introduction of charcoal through their tops and the discharge of ashes through their bottoms, as indicated by the arrows in the sectional view of FIGURE 4. The fireboxes may be advantageously constructed with open tops, such as the top openings 15 and 16, and a partially closed bottom providing the restricted openings 17 (FIG. 3) and 18 (FIG. 4). Inclined outward flange members 19, 20 and 21, 22 are provided along the sides respetcively of the top openings 15, 16, to facilitate the introduction of charcoal and also to provide for a more uniform heating of the cooker top 23, as will subsequently be explained. The bottom end portions of the fireboxes 11 and 12 may advantageously be provided with inclined inwardly-extending flange members 24, 25 (FIG. 3) and 26, 27 (FIG. 4), which respectively extend along the sides of the ash discharge openings 17 and 18. The flanges 24, 25 and 26, 27 serve to retain the charcoal within the fireboxes while it is being burned, and at the same time direct the ash downwardly toward the discharge openings.

For accomplishing the objects of this invention, the backs or outside walls 28, 29 of the fireboxes may advantageously be made substantially closed, as when they are formed of an imperforate sheet of metal. In the illustration given, the outer walls 28, 29 of the fireboxes are provided with vertically-extending corrugations 30, 31 for the purpose of reinforcing or stiffening these members. The side or end walls 32, 33 and 34, 35 respectively of the fireboxes 11 and 12 may also be formed substantially closed or imperforate. The inner faces 13, 14 are provided with openings to permit direct radiation of the meat or other food being broiled from the burning charcoal within the boxes. While these radiation faces may be apertured in various ways, such as by the use of expanded metal or heavy screen, it has been found advantageous to employ a series of vertically-extending slots, such as the slots 36, 37. In the illustration given, these slots are formed by slitting the metal sheets along vertically-extending lines with cutouts at the top and bottom, and folding out fin members such as the fins 38, 39 on each side of the openings. These fins serve to reinforce and stiffen the members forming the radiation faces 13, 14.

While some of the objects of the present invention may be accomplished without providing for the relative adjustability of the fireboxes 11 and 12, or, more particularly, the radiation faces 13, 14, is is preferred to mount the fireboxes on the frame 10 by means permitting the distance between the inner faces 13, 14 to be selectively varied. In the illustration given, the sides 40, 41 of the perimetric base frame 10 are provided at their upper ends with outwardly-extending flanges 42, 43 (as shown more clearly in FIGS. 6 and 8) which function as slide tracks. The flange tracks 42, 43 cooperate with the firebox support feet 44, 45, 46 and 47. These support feet respectively provide channel brackets 48, 49, 50 and 51, which slidably receive the flange tracks and ride thereon. More specifically, the channel brackets 48, 50 receive the track 42, while the channel brackets 49, 51 respectively receive the flange track 43. In this construction, the fireboxes 11, 12 can be moved toward or away from each other, thereby varying the distance between the radiation faces 13, 14.

In accordance with the present invention, there is also provided means for supporting food in vertically disposed alignment between inner faces 13, 14 of the fireboxes 11, 12. In the illustration given, there is provided a basket assembly consisting of a basket 52 and a clamping ring 54, which is slidably received on the handle 55 of the basket, as shown in FIGURES 1 and 12. The upper end of basket 52 is provided with a pair of spaced hooks 56 and 57, which are designed to support the basket assembly from hanger rods 58 and 59. The hanger rods 58, 59 are supported on the upper ends of the fireboxes 11 and 12. In the illustration given, the rods are fixed at one end to the fireboxes for movement therewith while being slidably supported at their other ends. More specifically, rod 59 is attached to the inner flange 21 of the box 12, while the rod 58 is attached to the inner flange 20 of the box 11. The method of attachment is shown more clearly in FIG. 4, which shows the rod 59 provided with a downwardly-extending end portion 60 which passes in pivoted relation through the flange 21 and is secured therein by means of a cotter pin 61. The other end of the rod 59 is slidably received within a loop bracket 63, which is mounted on the inner flange 20 of box 11. The rod 58 has one end secured in the same way to the flange 20, and the other end slidably received in a bracket 62 mounted on the flange 21.

The basket cover 53 is provided with a handle 64 which cooperates with basket handle 55 and clamping ring 54. The forward end of cover 53 is provided with a pair of attachment loops 65, 66, which can be selectively positioned between the series of spaced bars 67 forming the forward end of the basket 52. This permits meats and foods of varying thickness to be clamped securely within the basket assembly. Since this arrangement is not new in itself, it is not believed to be necessary to further describe it herein.

The portable charcoal cooker of this invention also may advantageously include a cooker top, such as the member 23. In the illustration given, cooker top 23 is detachably supported on the upper portions of the fireboxes 11 and 12, and is arranged to extend over the tops of the fireboxes. The cooker top 23 provides a horizontally-extending cooking plate 68. As illustrated in FIG. 1, the plate 68 can be used as a heating surface for utensils such as a skillet or a pan. In the illustration given, cooker top 23 is provided with leg brackets 69, 70, 71 and 72, which are positioned adjacent the corners of the top and are arranged to seat respectively on the upper ends of the firebox sides 32, 33, 34 and 35, as shown more clearly in FIGS. 5 and 6. It will be noted that legs 69, 70, 71 and 72 support the cooking plate 68 at a closely spaced distance from the tops of the fireboxes (see FIG. 3). This permits the hot combustion gases to be discharged through the openings 15, 16, the top of the fireboxes, and to flow over the inside surface of the plate 68, as indicated by the arrows in FIG. 3. It will be understood that the plate 23 also receives heat by radiation and metal-to-metal conduction, but the flow of combustion gases over the inside surface is desirable in promoting more uniform heating of the plate 68. By having the legs 69, 71 and 70, 72 respectively spaced apart, as indicated in FIG. 1, insertion and removal of the basket assembly is facilitated.

So that fireboxes 11, 12 and the cooker top 23 are at a convenient height, it is desirable to provide leg means for supporting the base frame 10. In the illustration given, the sides 73, 74 of the base frame 10 are provided respectively with sockets 75, 76 and 77, 78, having open bottoms and partially closed upper ends to receive and hold the upper ends of the U-shaped leg members 79 and 80, as shown more clearly in FIG. 7. To provide for greater stability, the leg members 79, 80 may be inclined outwardly.

To provide for the collection and removal of the ashes discharged from the fireboxes 11, 12 through the bottom openings 17, 18, there may advantageously be provided a pan 81, which is carried by frame 10 and extends thereacross beneath the fireboxes 11 and 12 and the basket assembly. As shown more clearly in FIG. 8, the sides, such as the side 73, may provide a lower flange, such as the flange 82, extending along the upper portion of the pan 81. This permits the tray to slide outwardly for removal, as shown in FIG. 6. The ashes and drippings collecting in the pan 81 can thereby be conveniently removed and disposed of.

The various elements of the charcoal cooker described above may advantageously be fabricated from steel sheet and rod stock, such as cold rolled steel. The steel parts may be coated to improve appearance and provide rust resistance, such as aluminum coated or zinc coated steel. The separate components may be assembled by any convenient means such as spot or projection welding. Since the particular fabrication and assembly may follow well known procedures and techniques, which would be obvious to those skilled in the art from an inspection of the drawings, it is not believed that it is necessary to further described such procedures herein. However, it is desirable to provide for the convenient assembling and disassembling of the cooker, thereby making it easier to transport from place to place in a knocked-down condition.

In the illustration given, the cooker can be readily disassembled by removing the cooker top 23. This can be lifted for removal, as indicated in FIG. 1. The basket assembly comprising the basket 52, the cover 53, and the clamp 54 can be readily removed as a unit by lifting the hooks 56, 57 off of the rods 58, 59. The fireboxes can then be removed by sliding them outwardly until they release from the tracks 42, 43. The hanger rods 58, 59 may be pivoted into alignment with their respective fireboxes. The ash pan 81 can be removed by sliding it outwardly as indicated in FIG. 6, and the legs can be separated from the base frame 10 by pulling their upper ends out of the sockets 75, 76, 77 and 78. The components can then be stacked or packed in a small container for easy transportation. It will be understood that the assembly of the components will simply follow reverse procedures to that described for the disassembly.

OPERATION

The operation of the assembled cooker will be largely apparent from what has heretofore been said. However, there are a few points which may require additional comment.

One convenient procedure for firing the cooker is as follows: With the cooker top 23 removed, a small pile of charcoal is introduced into each of the fireboxes 11 and 12. The initial charge of charcoal will normally form a pile near the center of the bottoms of the fireboxes and will not extend upwardly more than a third the height of the fireboxes. It is then a simple matter to pour charcoal lighter fluid on these small piles of charcoal and ignite them by means of a match. After the initial charges of charcoal are burning well, they can be spread out over the bottom of the fireboxes by the use of a stick or poker, and then the boxes can be filled with charcoal to the desired level, which will normally be up to a level near the top of the fireboxes. The charcoal burning in the bottom of the boxes will then ignite the rest of the charcoal, and within a period of 15 to 30 minutes the charcoal in the fireboxes should all be ignited and the stove ready for use.

Draft air will enter through the bottom opening 17, 18 of the fireboxes, and also to some extent through the vertically-extending slots 36 or 37. This will provide a chimney-type action which will keep the charcoal burning well. As the charcoal burns, ashes will be discharged through the bottom openings 17, 18, and the charcoal will settle down within the fireboxes. Additional charcoal can then be added at any time through the top openings 15, 16, although the addition of further charcoal will usually not be necessary for cooking one meal.

Depending on the intensity of heat and rate of cooking desired for the steaks, hamburgers, etc. to be cooked within the assembly formed by the basket 52 and the cover 53, the fireboxes 11 and 12 will be moved inwardly on slide tracks 42, 43. In FIG. 3, the fireboxes 11 and 12 are shown in selected outer positions in solid lines, while selected inner positions are indicated in dotted lines. It will be understood that a range of different positions may be achieved. Because of the slidable arrangement of the boxes 11 and 12, they can be readily shifted, even when hot. A stick or poker can be used to push the fireboxes in the desired direction. The leg brackets 69, 70, 71 and 72, permit the upper portions of the fireboxes 11, 12 to slide relative to the cooking top without removal of the top, if desired. As previously indicated, melted fat and drippings from the meat will fall downwardly into the pan 81 and thus will not come into contact with the burning charcoal. This arrangement is quite effective in preventing grease fires.

In FIGS. 10–13, there is shown a modification of the cooker as previously described herein. In the modification, corresponding parts have been given the same numbers except that the numbers have been primed. Broadly speaking, the modification consists of hinged or pivotally mounted doors which can be applied to one or both of the open sides of the cooker.

One convenient construction for such a door is illustrated in FIGS. 10 and 11. As there shown, the door 100 consists of a rectangular sheet of metal, which has its outer edge notched at 101 and 102 to provide integral, downwardly-extending pin portions 103 and 104. The end wall 35' of the firebox 12' is provided with outwardly-extending tabs 105 and 106, which provide openings for receiving the pin portions 103 and 104, respectively. If desired, the tabs 105 and 106 can be formed integrally with the end wall 35' by being cut out of the end wall and folded outwardly, as indicated. The pivotal action of the assembled door is illustrated in FIG. 10, where two positions of the door are shown, one in solid lines and one in phantom.

As shown more clearly in FIGS. 12 and 13, the opposite end wall 34' of the firebox 12' can similarly be provided with a hingedly-mounted door 108. In the same manner, the end walls 32' and 33' of firebox 11' can be provided with doors 109 and 107, respectively. Preferably, the pair of doors 108, 109 are wider than doors 100, 107. With the dimensioning shown, when the fireboxes 11' and 12' are in an outer position, as indicated in FIG. 12, the inner edges of the doors 108, 109 will slightly overlap when in their fully-closed position. On the other hand, the doors 100, 107 will be spaced slightly apart to permit the handles 55', 64' to extend therebetween. In FIG. 13, the fireboxes 11', 12' are shown in an inner position. In this position, the doors 108, 109 will overlap, while the doors 100, 104 incline outwardly, with their inner edge portions resting against the handles 55', 64'. Thus, the doors function as adjustable closures for the open ends of the cooker when the fireboxes are positioned outwardly or inwardly or in any intermediate position.

The doors are useful for maintaining a more uniform heat across the basket assembly, which consists of the basket 52' and the basket cover 53'. Thus, food positioned in the outer portions of the baskets will tend to be cooked at more nearly the same rate as food positioned in the central portions of the basket. The doors also have the advantage of providing an oven-type action, and they are particularly effective when the cooker is used outdoors in cold weather or in the wind. Under some conditions, it may be sufficient to close the doors at only one end of the cooker. For example, the doors 108, 109 can be used separately from the doors 100, 107. Under wind conditions, the cooker can be positioned so that the wind is deflected by the doors 108, 109, and the doors 100, 107 can be left open or removed entirely. This will permit the food to be observed more readily while it is being cooked, while at the same time providing wind protection and assuring more uniform and rapid cooking.

While in the foregoing specification this invention has been described in relation to a specific embodiment thereof and many details have been set forth for purpose of illustration, it will be apparent to those skilled in the art that the invention is susceptible to other embodiments and that many of the details described herein can be varied considerably without departing from the basic principles of the invention.

I claim:

1. In a portable charcoal cooker, the combination comprising a perimetric, horizontally-extending base frame, leg means for supporting said base frame in an elevation above the ground, a pair of vertically-extending fire boxes for holding and burning charcoal extending above said base frame, a pair of opposite sides of said support frame providing outwardly projecting slide tracks, means for supporting said fire boxes on said base frame including support feet extending downwardly from said fire boxes and providing channel brackets slidably received on said slide tracks for movement therealong, and means for supporting the food to be cooked between said fire boxes, said food-supporting means including hanger rod means supported on the upper end portions of said fire boxes and extending across the space therebetween, said rod means being pivotally connected at one end thereof to one of said fire boxes and the other of said fire boxes being slidably guided on said rod means and being adapted to be detached from the other end of said rod means.

2. In a portable charcoal cooker, the combination comprising a perimetric, horizontally-extending base frame, leg means for supporting said base frame in an elevation above the ground, a pair of vertically-extending fire boxes for holding and burning charcoal extending above said base frame, a pair of opposite sides of said support frame providing outwardly projecting slide tracks, means for supporting said fire boxes on said base frame including support feet extending downwardly from said fire boxes and providing channel brackets slidably received on said slide tracks for movement therealong, means for supporting the food to be cooked between said fire boxes, said fire boxes having open tops, and a cooker top detachably supported on the upper portions of said fire boxes and extending over the open tops thereof, said cooker top including an imperforate horizontally-extending cooking plate and leg means for supporting said plate above and closely spaced from said open tops, whereby the hot combustion gases from said fire boxes flow over the underside of said plate.

References Cited by the Examiner

UNITED STATES PATENTS

| | | | |
|---|---|---|---|
| 1,398,157 | 11/1921 | Segar | 99—390 X |
| 1,656,181 | 1/1928 | Elbert | 99—390 X |
| 2,314,772 | 3/1943 | Corra. | |
| 2,335,217 | 11/1943 | Tate | 99—390 X |
| 2,821,187 | 1/1958 | Tescula | 99—390 X |
| 2,891,465 | 6/1959 | Rogge | 99—390 X |
| 2,923,229 | 2/1960 | Halford | 99—390 X |
| 2,946,275 | 7/1960 | Compton | 99—390 |

FOREIGN PATENTS

| | | |
|---|---|---|
| 391 | 1886 | Great Britain. |
| 4,388 | 1909 | Great Britain. |

WALTER A. SCHEEL, *Primary Examiner.*

BILLY J. WILHITE, *Examiner.*